Patented Nov. 26, 1935

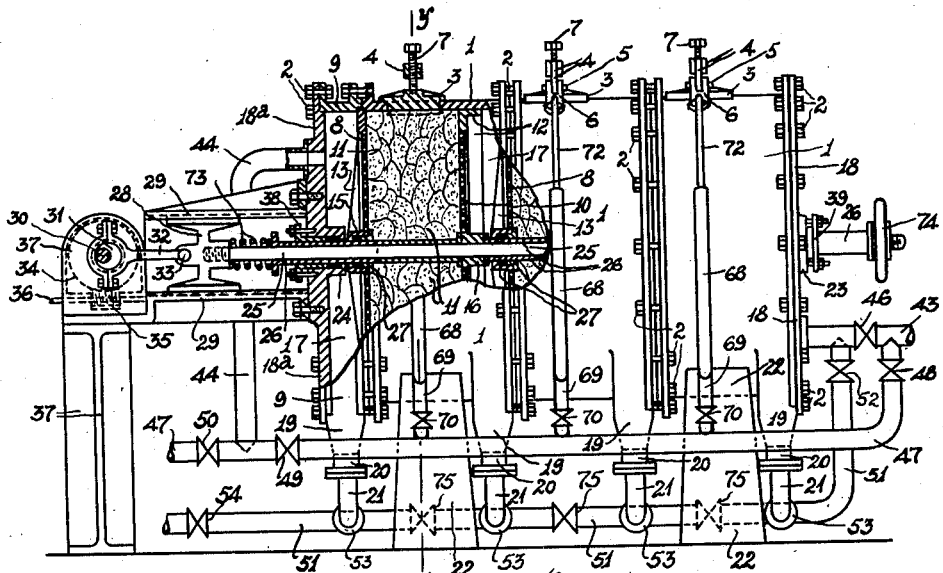
Nov. 26, 1935. M. C. SANTIAGO 2,022,524
APPARATUS FOR FILTERING LIQUIDS OR SEPARATING SOLIDS FROM LIQUIDS
Filed March 22, 1934

2,022,524

UNITED STATES PATENT OFFICE 2,022,524

APPARATUS FOR FILTERING LIQUIDS OR SEPARATING SOLIDS FROM LIQUIDS

Manoel Cordeiro Santiago, Johannesburg, Transvaal Province, Union of South Africa Application March 22, 1934, Serial No. 716,846
In the Union of South Africa August 25, 1933

4 Claims. (Cl. 210—189)

This invention relates to apparatus for filtering liquids, or separating solids from liquids. It has especial reference to apparatus of the kind comprising one or a plurality of filtering compartments or cells in each of which a filling of closely packed sponges is provided, which constitutes the filtering medium.

The present improvements appertain to means for cleaning or removing the separated and retained solid matter from the sponges or filtering medium, as and when required.

The object of the invention is to enable the sponge filtering medium to be cleaned in situ, or without removing the same from the filter cell or cells.

To the attainment of this object, the invention, in one form, as applied, for example, to a filter including a plurality of filter cells which are spaced apart, or so constructed or arranged as to provide between them chambers, spaces or compartments into which the liquid under treatment passes in its passage from cell to cell, consists of a construction in which one of the end plates or perforated covers of each cell is movable relative to the other and fixed plate or perforated cover, so that pressure can be applied through said movable cover to the sponge filtering medium in order to express therefrom separated and retained solid matter. The movable plates or perforated covers may be mounted on a central shaft or rod which extends through the fixed plates or covers and is adapted to have reciprocating motion imparted to it in order to reciprocate or operate all said movable plates or covers simultaneously.

Means may be provided and arranged to co-operate with the central rod or shaft in order to place the sponges under a suitable amount of compression during the filtering operation; and also for adjusting the variable pressure exerted on the sponge filtering medium during the cleaning operation. Indicating means may be combined with the central shaft or rod for indicating the position of the movable perforated plates during the normal filtering operation, and also any adjusted positions of said plates during the cleaning operation.

The apparatus may include means for introducing the cleaning liquid at various points around the circumference or exterior of the filtering cells, and the supply of the cleaning liquid may be controlled so as to permit of it being introduced into each of the cells independently.

The solid matter which collects in the bottom of the chambers, spaces or compartments separating the cells may be removed therefrom through a common discharge pipe by a suitable arrangement of pipes, connections and valves.

Openings, adapted to be opened and closed, will be provided in a suitable position or positions in the chambers, spaces or compartments between or at the ends of the cells, which openings will form outlets for the solid matter and associated liquid expressed from the sponges in the operation of cleaning the same. These outlets may be connected to a common discharge or delivery pipe.

In the cleaning operation the cleaning liquid will be caused to flow in the reverse direction to the normal filtering flow. For this purpose means are provided for introducing such liquid at the normal filtrate delivery end of the filtering apparatus, so that it will pass from cell to cell to the normal inlet end of the filtering apparatus.

The invention will be further explained with the aid of the accompanying drawing, in which, Fig. 1 is a part-sectional elevation of a filter embodying the invention.

Fig. 2 is a transverse section of Fig. 1 on line $y$—$y$, looking in the direction of the inlet end.

Fig. 3 is a diagrammatic plan view illustrating the arrangement of the various supply and discharge pipes and their controlling valves, applicable for the form of the invention shown in Figs. 1 and 2, and Fig. 4 is a part-sectional elevation illustrating portion of a filter incorporating certain modifications.

In the several figures of the drawing the same numerals denote the same or corresponding parts in so far as they apply.

In the drawing, the apparatus includes a plurality of the filter cells 1, each of which is shown including a cylindrical main portion flanged at both ends, and which are connected together through the medium of the flanges by bolts 2. The cells 1 are constructed at the top with openings fitted with detachable flanged covers 3; 4 being bridge pieces detachably secured by pins 5 to lugs 6 formed on the top of the cells at the sides of the openings, and 7 fixing screws screwed through the bridge pieces 4 on to the top of the covers for securing them in position.

8 represent the fixed perforated end plates of the several cells 1, which are fixed in position in recesses at the outlet side of each cell, between the flanged extremities of the cells, and, in the case of the outlet end of the filter, between the outer flange of the last cell and a flanged end part or section 9.

10 are the movable perforated end plates, which are slidably arranged in the other ends of the cylindrical portions of the cells 1, and form or provide between them and their co-operating fixed plates 8 the spaces in which the sponge filtering medium 11 is closely packed. The plates 10 are each fashioned with a flanged rim 12 which fits the cylindrical portion of the cell 1 and operates as a guide for the plate 10. The plates 8 are constructed with radial webs 13, and the plates 8 and 10 with central bosses 15, 16, respectively.

The movable plates 10 are so arranged that they form or provide spaces, chambers or compartments 17 between them and the adjacent fixed plates 8 of the next cells 1.

The inlet end of the filter is closed by an end plate 18. It is bolted to the outer flange of the last cell 1, and forms with the last movable filter plate 10 at the receiving end the space, chamber or compartment 17—see Fig. 4—at that end. 18a is the end plate for the delivery end of the filter, bolted to the outer flange of the end part or section 9, and forming, with the said section 9 and the adjacent fixed plate 8, the other end space, chamber or compartment 17.

The cylindrical portions of the several cells 1, towards the inlet end of the filter, are constructed in their lower portions of hopper shape, as indicated at 19, the sides of which hoppers are inclined downwardly to the flanged outlets 20. To the flanged outlets 20 discharge pipes 21 are fixed. The end section 9 is similarly constructed of hopper shape at 19, and with a flanged outlet 20 to which is fitted the discharge pipe 21.

The filter is shown supported on pedestals 22, appropriately arranged along its length.

The end plates 18, 18a, are each constructed at the centre with a boss 23, 24, respectively, through which passes a rod or shaft 25 on which are fixed the several movable filter plates 10. Around the rod or shaft 25 and between the bosses 16 of the several movable filter plates 10 are arranged hollow sectional distance pieces or sleeves 26, which maintain the several movable filter plates 10 in correct relative position when the shaft or rod 25 is reciprocated. The bosses 15 of the fixed filter plates 8 are constructed to form and receive stuffing boxes and glands 27 for making sliding water-tight joints between them and the sleeves 26.

The means for imparting reciprocating motion to the movable filter plates 10, through the medium of the rod or shaft 25, is shown including a crosshead 28—to which one end of the rod or shaft 25 is secured—guides 29 for said crosshead 28, a driving shaft 30, an eccentric 31 on said shaft 30, and an eccentric rod 32 attached to the crosshead 28 at 33. On the shaft 30 is mounted a worm wheel 34, driven by a worm 35; 36 being the worm shaft driven by the motor or prime mover—not shown. 37 is a pedestal and housing for carrying the various parts of the driving means. The guides 29 for the crosshead 28 are fixed to the end plate or cover 18a of the filter.

A coiled spring 73 is arranged around that end of the rod or shaft 25 which is attached to the crosshead 28, between the latter and a flange on the adjacent end of the sectional sleeve or tubular distance piece 26, which spring 73 forms a safety cushioning means for the sectional sleeves 26 and movable filter plates 10. The boss 24 of the outlet end plate 18a has a stuffing box and gland 38 for making a sliding water-tight joint around the sleeve 26. The central boss 23 of the other end plate 18 is also constructed to form and receive a stuffing box and gland 39 to make a sliding water-tight joint around the sleeve 26, which works through it.

The inlet pipe 43 for the liquid to be filtered is fitted to an opening in the filter end cover 18 in proximity to the bottom thereof, and the outlet pipe 44 for the filtrate or filtered liquid is fitted to an opening in the other end plate 18a in proximity to the top of the filter.

In Fig. 3 the arrangement of pipes and valves is shown for introducing the liquid to be filtered through the pipe 43, and also for introducing the cleaning liquid through the pipe 44 to cause said liquid to pass through the filter in the reverse direction to the normal filtering flow. 46 is a valve in the pipe 43; 47 is a branch pipe connecting the pipes 43 and 44, 48 a valve in the pipe 47 near the pipe 43, and 49, 50, valves in the pipe 47 at opposite sides of the connection to pipe 44. 51 is another branch pipe from the pipe 43, and 52 a valve in said pipe 51 near the pipe 43. The discharge pipes 21 of the several chambers, compartments or spaces 17 are connected to the pipe 51 and fitted with valves 53; 54 being a further valve in the pipe 51.

In the normal filtering operation the valve 46 in the inlet pipe 43 will be opened, and the valves 48, 52, in pipes 47, 51, respectively, will be closed; the valve 50 in the pipe 47 will be opened and the valve 49 in said pipe closed. This allows the liquid to be filtered to enter the first space, chamber or compartment 17, and to pass through the various filter cells 1 successively into the several chambers or compartments 17, from the last of which the filtrate flows out through pipe 44 and valve 50.

To clean the filter by passing a cleaning liquid through the several cells 1 in the reverse direction to that of the filtering flow, the valve 46 in pipe 43, and valve 50 in pipe 47 are closed, and the valves 48, 49 in pipe 47 are opened. This diverts the flow of the liquid from pipe 43 to pipe 44, and thence into the space, chamber or compartment 17 provided in the section 9. The valves 53 in the discharge pipes 21 can now be opened and the driving means for the several movable filter plates 10 set in motion. The reciprocation of said plates 10 by these means compresses or squeezes the sponge filtering medium 11 of the several cells 1, and then allows it to expand, so that, aided by the inflowing reverse stream of liquid the solid matter is expressed or displaced from said sponges 11, and carried through the movable perforated plates 10 into the spaces, chambers or compartments 17, and passes out from the latter through the discharge pipes 21, valves 53, pipe 51 and valve 54 to any desired point.

The pipes 21 and the valves 53 permit any solid matter which is deposited in the hoppers 19 of any one or more of the compartments, chambers or spaces 17 to be withdrawn whilst the process of filtering is proceeding, by opening any one, or more, or all of the valves 53 and valve 54 in pipe 51. The valve 52 in pipe 51 may be opened, and valve 48 in pipe 47 closed. This will allow the pipe 51 to be flushed by diverting through the valve 52 a portion of the liquid from the pipe 43.

The filter as shown comprises three only of the filter cells 1, any other number may be employed with additional means for introducing cleaning liquid at several points through the cylindrical wall of each cell. For this purpose there is provided for each cell 1 an arcuate pipe 68 which communicates, through branch 69 and valve 70, with the pipe 47. The pipe 68 is shown provided with five branches 71, which extend through holes in the cylindrical wall of the cell 1, around the sponge filtering medium 11 at substantially equidistant points. 72 represent two smaller extension pipes, which at one end communicate with the ends of the pipe 68 and at their other ends extend through the wall of the cell and communicate with the interior thereof at two points which are substantially the same distance apart from each other and from the branches 71 as the latter are from each other. This construction ensures distribution of the additional cleaning liquid when the supply of the same is admitted to the cells 1 through pipe 47 by closing valve 46 and opening valve 48.

To allow of the pressure exerted by the movable filter plates 10 on the sponge filtering medium 11 being varied, a nut 74 in the form of a handwheel is provided on the threaded end portion of the rod or shaft 25. The nut 74 abuts the flanged outer end of the last sectional sleeve 26, so that by screwing it in the one direction it moves the sectional sleeves 26 and with them the intervening filter plates 10 in one direction along the shaft or rod 25, against the action of the spring 73. This arrangement will admit of the relative positions of the several movable filter plates 10 being varied whilst the reciprocation of the same through the driving means is being effected. This enables the movable filter plates 10 to be advanced slowly in the direction of the fixed filter plates 8 as the cleaning of the sponge filtering medium 11 by the detaching and displacing of the retained solid matter therein by the reverse flow and/or the flow through pipes 47, 68 and 72, proceeds, consequent upon increase in the resiliency of the sponges due to the cleaning action. The spring 73 will operate to aid the return of the movable filter plates 10 to the normal filtering position, when the nut 74 is turned to move it in the direction of the outer end of the rod or shaft 25. The pipe 51 in this construction is provided with valves 75 between the pipes 21, so as to allow the pipe 51 to be closed for any purpose between the points of connection of the same with the discharge pipes 21.

In the modified arrangement illustrated in Fig. 4, the handwheel 76 is fixed on the one threaded extremity of the rod or shaft 25 by nuts 77. On this threaded end of the rod 25, next to the inner nut 77, is screwed a thrust collar 78, and on the adjacent end of the last sleeve section 26 is secured a further hollow thrust member 79. Between the collar 78 and member 79 a ball bearing 80 is arranged. The other end of the rod or shaft is threaded and screwed into the crosshead 28, as indicated at 81. 82 is a hollow casing which is fixed at one end to the end plate or cover 18a, and has attached to it at its other end the guides 29 for the crosshead 28. On the screw-threaded portion of the rod or shaft inside the casing 82 there is fixed a thrust collar 83, secured by nut 84, and on the rod or shaft 25 in front of the fixed collar 83 there is loosely mounted a thrust member 85. Between the collar 83 and member 85 a ball bearing 86 is arranged. Between the thrust member 85 and a shoulder formed around a first short section 87 of the sectional sleeve 26, a coiled spring 88 is arranged. The short sleeve section 87 is constructed with a recess, provided with packing, in which fits and is held in position the adjacent end of the sectional sleeve 26 by the spring 88. The intermediate fixed filter plates 8 are constructed at the centre to form the stuffing boxes 27, and the bosses 16 of each of the adjacent movable filter plates 10 are constructed to fit the stuffing boxes 27 when the movable filter plates 10 are in the normal filtering position, in which position they are resiliently held by the spring 88. The construction and arrangement of the parts as above described allows of easy adjustment of the movable filter plates 10 in relation to the fixed filter plates 8, by screwing the rod or shaft 25 into the crosshead 28.

An arrangement is shown in this figure for indicating the positions of the movable filter plates 10 relative to the fixed plates 8. Said arrangement comprises a pointer 89 fixed to the end plate 18, and graduations 90 on the outer end sleeve section 26. This indicator serves for indicating the normal filtering position of the movable filter plates 10; the extent of any movement imparted to them when reciprocating; any adjusted stationary position of said plates 10; and any adjusted position whilst being reciprocated and the extent of their reciprocal movement.

What I claim as my invention and desire to protect by Letters Patent is:—

1. A filtering apparatus including a plurality of filtering cells with spaces at both sides of each of said cells for receiving and collecting the separated solid matter, sponge filtering material closely packed in the cells, means for intermittently compressing the sponge filtering material in all the cells for the purpose of cleaning the same, and means for introducing cleaning liquid at a plurality of points around the sponge filtering material of each cell, as set forth.

2. A filtering apparatus including a plurality of filter cells with spaces at both sides of each of said cells for receiving and collecting the separated solid matter, each cell having a fixed perforated end plate, a movable perforated end plate, and sponge filtering material closely packed in the cell between said end plates, a rod upon which all the movable perforated end plates are mounted, so that they are operated simultaneously through the medium of said rod, means for reciprocating said rod, and means for simultaneously adjusting the position of all the movable end plates relative to the fixed end plates, as set forth.

3. A filtering apparatus including a plurality of filter cells with spaces at both ends of each of said cells for receiving and collecting the separated solid matter, each cell having a fixed perforated end plate, a movable perforated end plate, and sponge filtering material closely packed in the cell between said end plates, a rod upon which all the movable perforated end plates are mounted, so that they are operated simultaneously through the medium of said rod, means for reciprocating said rod, and means for simultaneously resiliently adjusting the position of all the movable end plates relative to the fixed end plates, as set forth.

4. A filtering apparatus including a plurality of filter cells with spaces at both sides of each of said cells for receiving and collecting the separated solid matter, each cell having a fixed perforated end plate, a movable perforated end plate, and sponge filtering material closely packed in the cell between said end plates, a rod upon which all the movable perforated end plates are mounted, so that they are operated simultaneously through the medium of said rod, means for reciprocating said rod, means for simultaneously adjusting the position of all the movable end plates relative to the fixed end plates, and means for indicating the positions of the various movable plates relative to the fixed plates, as set forth.

MANOEL CORDEIRO SANTIAGO.